US009562981B2

(12) United States Patent
Ruet et al.

(10) Patent No.: US 9,562,981 B2
(45) Date of Patent: Feb. 7, 2017

(54) SOURCE FOR MARINE SEISMIC ACQUISITION AND METHOD (71) Applicant: CGGVERITAS SERVICES SA, Massy (FR)

(72) Inventors: Laurent Ruet, Massy (FR); Robert Dowle, Massy (FR); Benoit Teyssandier, Massy (FR)

(73) Assignee: CGG SERVICES SAS, Massy (FR)

( * ) Notice: Subject to any disclaimer, the term of this patent is extended or adjusted under 35 U.S.C. 154(b) by 152 days.

(21) Appl. No.: 14/453,056

(22) Filed: Aug. 6, 2014

(65) Prior Publication Data
US 2014/0347960 A1 Nov. 27, 2014

Related U.S. Application Data (62) Division of application No. 13/415,216, filed on Mar. 8, 2012, now Pat. No. 8,837,259.

(30) Foreign Application Priority Data

Oct. 19, 2011 (FR) ...................................... 11 59434

(51) Int. Cl.
*G01V 1/38* (2006.01)
*G01V 1/133* (2006.01)
(Continued)

(52) U.S. Cl.
CPC ............... *G01V 1/133* (2013.01); *G01V 1/005* (2013.01); *G01V 1/135* (2013.01); *G01V 1/143* (2013.01);
(Continued)

(58) Field of Classification Search
USPC ........................................................ 367/142
See application file for complete search history.

(56) References Cited

U.S. PATENT DOCUMENTS 3,288,243 A 11/1966 Silverman
3,331,050 A 7/1967 Kilmer et al.
(Continued)

FOREIGN PATENT DOCUMENTS

EP 2 267 486 A2 12/2010
GB 2 183 834 A 6/1987
(Continued)

OTHER PUBLICATIONS

Examination Report in related British Application No. GB1215264.1, dated Feb. 12, 2015.
(Continued)

*Primary Examiner* — James Hulka
(74) *Attorney, Agent, or Firm* — Patent Portfolio Builders PLLC (57) ABSTRACT A method for generating acoustic waves under water includes actuating first and second pistons with an actuator system provided inside an enclosure of a source element, to generate a wave having a first frequency, and actuating the first and second pistons with a pressure mechanism attached to the enclosure, to control a pressure of a fluid inside the enclosure such that a pressure of the fluid is substantially equal to an ambient pressure of the enclosure. The enclosure has first and second openings and the first and second pistons are configured to close the first and second openings.

10 Claims, 10 Drawing Sheets (51) Int. Cl.
*G01V 1/00* (2006.01)
*G01V 1/143* (2006.01)
*G01V 13/00* (2006.01)
*G01V 1/135* (2006.01)
*G10K 11/18* (2006.01)

(52) U.S. Cl.
CPC .............. *G01V 1/38* (2013.01); *G01V 13/00* (2013.01); *G10K 11/18* (2013.01); *Y10T 29/49005* (2015.01); *Y10T 29/49826* (2015.01)

(56) References Cited

U.S. PATENT DOCUMENTS

| | | | |
|---|---|---|---|
| 3,691,516 | A | 9/1972 | Graham et al. |
| 3,885,225 | A | 5/1975 | Anstey et al. |
| 4,030,063 | A | 6/1977 | Wallen |
| 4,069,470 | A | 1/1978 | Cunningham et al. |
| 4,159,463 | A | 6/1979 | Silverman |
| 4,168,485 | A | 9/1979 | Payton et al. |
| 4,188,610 | A | 2/1980 | Nelson |
| 4,272,226 | A | 6/1981 | Osborne |
| 4,295,213 | A | 10/1981 | Mifsud |
| 4,353,120 | A | 10/1982 | Pickens |
| 4,391,299 | A | 7/1983 | Holmes |
| 4,441,174 | A | 4/1984 | Ray et al. |
| 4,514,834 | A | 4/1985 | Hanson et al. |
| 4,556,963 | A | 12/1985 | Hugus et al. |
| 4,636,956 | A | 1/1987 | Vannier et al. |
| 4,715,020 | A | 12/1987 | Landrum, Jr. |
| 4,799,201 | A | 1/1989 | Nelson |
| 4,823,326 | A | 4/1989 | Ward |
| 4,885,726 | A | 12/1989 | Myers |
| 4,953,657 | A | 9/1990 | Edington |
| 4,969,129 | A | 11/1990 | Currie |
| 4,982,374 | A | 1/1991 | Edington et al. |
| 5,062,089 | A | 10/1991 | Willard et al. |
| 5,128,900 | A | 7/1992 | Cole |
| 5,199,005 | A | 3/1993 | Forsberg |
| 5,410,517 | A | 4/1995 | Andersen |
| 5,426,618 | A | 6/1995 | Chen et al. |
| 5,703,833 | A | 12/1997 | Allen |
| 5,719,821 | A | 2/1998 | Sallas et al. |
| 5,721,710 | A | 2/1998 | Sallas et al. |
| 5,901,112 | A | 5/1999 | Walker |
| 5,959,539 | A | 9/1999 | Adolph et al. |
| 5,959,939 | A | 9/1999 | Tengham et al. |
| 6,028,818 | A | 2/2000 | Jeffryes |
| 6,049,507 | A | 4/2000 | Allen |
| 6,076,629 | A | 6/2000 | Tengham |
| 6,076,630 | A | 6/2000 | Ambs |
| 6,161,076 | A | 12/2000 | Barr et al. |
| 6,181,646 | B1 | 1/2001 | Bouyoucos et al. |
| 6,253,156 | B1 | 6/2001 | Bui-Tran et al. |
| 6,327,537 | B1 | 12/2001 | Ikelle |
| 6,366,857 | B1 | 4/2002 | Bird et al. |
| 6,370,477 | B1 | 4/2002 | Vermeer |
| 6,464,035 | B1 | 10/2002 | Chelminski |
| 6,545,944 | B2 | 4/2003 | de Kok |
| 6,597,632 | B2 | 7/2003 | Khan |
| 6,606,958 | B1 | 8/2003 | Bouyoucos |
| 6,664,788 | B2 | 12/2003 | Hornbostel et al. |
| 6,687,619 | B2 | 2/2004 | Moerig et al. |
| 6,704,245 | B2 | 3/2004 | Becquey |
| 6,714,867 | B2 | 3/2004 | Meunier |
| 6,754,590 | B1 | 6/2004 | Moldoveanu |
| 6,766,256 | B2 | 7/2004 | Jeffryes |
| 6,807,508 | B2 | 10/2004 | Becquey |
| 6,842,701 | B2 | 1/2005 | Moerig et al. |
| 6,942,059 | B2 | 9/2005 | Smith |
| 7,257,049 | B1 | 8/2007 | Laws et al. |
| 7,327,633 | B2 | 2/2008 | Bagaini et al. |
| 7,515,505 | B2 | 4/2009 | Krohn et al. |
| 7,551,518 | B1 | 6/2009 | Tenghamn |
| 7,859,945 | B2 | 12/2010 | Sallas et al. |
| 7,881,160 | B2 | 2/2011 | Rouquette |
| 7,974,152 | B2 | 7/2011 | Tenghamn |
| 8,271,173 | B2 | 9/2012 | Wilmanowicz et al. |
| 8,339,896 | B2 | 12/2012 | van Borselen et al. |
| 8,837,259 | B2* | 9/2014 | Ruet ............... G01V 1/005 367/142 |
| 2003/0176974 | A1 | 9/2003 | Baliguet et al. |
| 2004/0089499 | A1 | 5/2004 | Smith |
| 2007/0133354 | A1 | 6/2007 | Bagaini et al. |
| 2009/0251994 | A1 | 10/2009 | Rouquette |
| 2010/0118647 | A1 | 5/2010 | Tenghamn |
| 2010/0232260 | A1 | 9/2010 | Zowarka et al. |
| 2011/0038225 | A1 | 2/2011 | Tenghamn |
| 2011/0085416 | A1 | 4/2011 | Sallas |
| 2011/0085422 | A1 | 4/2011 | Thompson et al. |
| 2011/0128818 | A1 | 6/2011 | Eick et al. |
| 2011/0162906 | A1 | 7/2011 | Harper et al. |
| 2011/0317515 | A1 | 12/2011 | Tenghamn |
| 2012/0188845 | A1 | 7/2012 | Jeffryes |
| 2012/0314536 | A1 | 12/2012 | Bagaini |
| 2013/0100778 | A1* | 4/2013 | Ruet ............... G01V 1/005 367/142 |

FOREIGN PATENT DOCUMENTS

| | | |
|---|---|---|
| GB | 2259141 A | 3/1993 |
| GB | 2 280 032 A | 1/1995 |
| GB | 2 306 219 A | 4/1997 |
| WO | 86/03015 | 5/1986 |
| WO | 01/16621 A1 | 3/2001 |
| WO | 2009/077762 A2 | 6/2009 |
| WO | 2012/123883 A2 | 9/2012 |
| WO | 2012170608 A2 | 12/2012 |

OTHER PUBLICATIONS

Examination Report in related British Application No. GB1215264.1, dated Jul. 31, 2015.
Danish Patent and Trademark Office Search Report in related Application No. PA 2012 70506, dated Apr. 17, 2015.
William H. Dragoset, "Marine Vibrators and the Doppler Effect". Geophysics, vol. 53., No. 11, Nov. 1989, pp. 1388-1398.
Gary Hampson et al., "Effects of Source and Receiver Motion on Seismic Data", Geophysical Prospecting vol. 43, Issue 2, Feb. 1995, pp. 221-244.
J.E. Martin et al., Abstract of "Simultaneous Vibroseis Recording", Geophysical Prospecting, vol. 41, Apr. 1993.
Choon Byong Park et al., "Swept Impact Seismic Technique (SIST)", Geophysics, vol. 61, No. 6, Nov.-Dec. 1996, pp. 1789-1803.
William C. Pritchett, "An Example of Simultaneous Recording Where Necessary Signal Separation is Easily Achieved", Geophysics, vol. 56, No. 1, Jan. 1991 pp. 9-17.
E. Rietsch, "Vibroseis Signals With Prescribed Power Spectrum", Geophysical Prospecting, vol. 25, Issue 4, Dec. 1977, pp. 614-620.
Abd El-Aziz Khairy Abd El-Aal, "Harmonic by Harmonic Removal Technique for Improving Vibroseis Data Quality", Geophysical Prospecting, vol. 59, Issue 2, Mar. 2011, pp. 279-294.
E. Rietsch, "Computerized Analysis of Vibroseis Signal Similarity", Geophysical Prospecting, vol. 25, Issue 3, Sep. 1977, pp. 541-552.
Ulrich Polom, "Elimination of source-genrated noise from correlated vibroseis data (the 'ghost-seep' problem)", Geophysical Prospecting, vol. 45, Issue 4, Jul. 1997, pp. 571-591.
Written Opinion of the International Searching Authority in corresponding International Application No. PCT/EP2012/067998 mailed Oct. 17, 2012.
International Search Report in corresponding International Application No. PCT/EP2012/067998 mailed Oct. 17, 2012.
US Office Action mailed on Apr. 8, 2013, in related U.S. Appl. No. 13/677,661.
US Office Action mailed on Mar. 25, 2013, in related U.S. Appl. No. 13/677,713.
US Office Action mailed on May 9, 2013, in related U.S. Appl. No. 13/687,028.

(56) References Cited

OTHER PUBLICATIONS

US Office Action mailed on Mar. 7, 2013, in related U.S. Appl. No. 13/687,059.
US Office Action mailed on Apr. 15, 2013, in related U.S. Appl. No. 13/687,084.
Danish First Technical Examination mailed Jun. 4, 2013 with Search Report in related Application No. PA 2012 70503.
Danish First Technical Examination mailed Jun. 10, 2013 with Search Report in related Application No. PA 2012 70507.
International Search Report in related International Application No. PCT/EP2012/067999, mailed Aug. 9, 2013.
Written Opinion in related International Application No. PCT/EP2012/067999, mailed Aug. 9, 2013.
US Office Action mailed Aug. 26, 2013, in related U.S. Appl. No. 13/677,713.
US Office Action mailed Sep. 30, 2013, in related U.S. Appl. No. 13/687,028.
International Preliminary Report on Patentability mailed Jan. 28, 2014, in related International Application No. PCT/EP2012/067998.
US Office Action mailed May 29, 2013, in related U.S. Appl. No. 13/415,216.
Great Britain Search Report in corresponding Great Britain Application No. 1215264.1 dated Dec. 5, 2012.
Great Britain Search Report in corresponding Great Britain Application No. 1215276.5 dated Dec. 21, 2012.
Office Action in corresponding Chinese Application No. 20120331458.6 dated Oct. 25, 2016.

* cited by examiner

SOURCE FOR MARINE SEISMIC ACQUISITION AND METHOD

CROSS-REFERENCE TO RELATED APPLICATIONS

This application is a division of U.S. patent application Ser. No. 13/415,216, filed on Mar. 8, 2012, entitled "Source for Marine Seismic Acquisition and Method", which is related to, and claims priority from, French Patent Application No. 1159434, filed on Oct. 19, 2011, entitled "Underwater seismic vibro-acoustic source with pressure regulation", the disclosure of which is incorporated here by reference.

BACKGROUND

Technical Field

Embodiments of the subject matter disclosed herein generally relate to methods and systems and, more particularly, to mechanisms and techniques for generating seismic waves.

Discussion of the Background

Reflection seismology is a method of geophysical exploration to determine the properties of a portion of a subsurface layer in the earth, which information is especially helpful in the oil and gas industry. Marine reflection seismology is based on the use of a controlled source that sends energy waves into the earth. By measuring the time it takes for the reflections to come back to plural receivers, it is possible to estimate the depth and/or composition of the features causing such reflections. These features may be associated with subterranean hydrocarbon deposits.

For marine applications, sources are essentially impulsive (e.g., compressed air is suddenly allowed to expand). One of the most used sources are airguns which produce a high amount of acoustics energy over a short time. Such a source is towed by a vessel either at the water surface or at a certain depth. The acoustic waves from the airgun propagate in all directions. A typical frequency range of the emitted acoustic waves is between 6 and 300 Hz. However, the frequency content of the impulsive sources is not fully controllable and different sources are selected depending on the needs of a particular survey. In addition, the use of impulsive sources can pose certain safety and environmental concerns.

Thus, another class of sources may be used are vibratory sources. Vibratory sources, including hydraulically powered sources and sources employing piezoelectric or magnetostrictive material, have been used in marine operations. However, there is no large scale use of such sources as they have limited power and are not reliable due to the number of moving parts required to generate the seismic waves. A positive aspect of vibratory sources is that they can generate signals that include various frequency bands, commonly referred to as "frequency sweeps". In other words, the frequency band of such sources may be controlled better compared to impulsive sources. However, the known vibratory sources do not provide a high vertical resolution as the typical frequency range of a marine seismic source represents approximately four octaves. A few examples of such sources are now discussed.

U.S. Pat. No. 7,551,518, the entire content of which is incorporated herein by reference, describes a flextensional source. The source includes a combination of actuators having a flexure system that acts as a force transformer. A disadvantage of such a system is the large size required to fit the flexible elements in order to prevent overstressing them. The reliability of such system may also be a weak point as those flexible parts are constantly subjected to deformations during sound emission.

International Patent WO 8603015, the entire content of which is incorporated herein by reference, describes a seismic generator having a hydraulically driven piston source. However, the use of a pressurized hydraulic fluid to drive the piston might be a threat to the environment in case of a leak.

U.S. Pat. No. 6,464,035, the entire content of which is incorporated herein by reference, describes a towable marine seismic energy source for creating intense sweptfrequency and pulse-coded signals in a body of water. The fish-like source is half way between a pure vibrator and an impulse source. The source is driven by a system that uses a pressurized hydraulic fluid. Thus, there is a risk of polluting the environment. The source appears to be a weak sweep source because of stroke limitations, which is undesirable as a good source needs to generate low frequency sweeps.

Thus, based at least on the above noted deficiencies of the existing sources there is a need to develop new sources that will eliminate or minimize their impact on the environment, also be more reliable, have an extended lifetime, and increase the vertical resolution by adding at least another octave. Accordingly, it would be desirable to provide systems and methods that overcome the afore-described problems and drawbacks.

SUMMARY

According to one exemplary embodiment, there is a seismic vibro-acoustic source element configured to generate acoustic waves. The seismic vibro-acoustic source element includes an enclosure having first and second openings; first and second pistons configured to close the first and second openings; an actuator system provided inside the enclosure and configured to actuate the first and second pistons to generate a wave having a first frequency; and a pressure mechanism attached to the enclosure and configured to control a pressure of a fluid inside the enclosure such that a pressure of the fluid is substantially equal to an ambient pressure of the enclosure.

According to another exemplary embodiment, there is a source array for generating under sea seismic waves. The source array includes at least one seismic vibro-acoustic source element as noted above.

According to still another exemplary embodiment, there is a method for assembling a seismic vibro-acoustic source element configured to generate acoustic waves under water. The method includes a step of providing an enclosure having first and second openings; a step of installing an actuator inside the enclosure; a step of attaching to the actuator system first and second pistons in such a way to close the first and second openings; and a step of installing a pressure mechanism to the enclosure to control a pressure of a fluid inside the enclosure such that a pressure of the fluid is substantially equal to an ambient pressure of the enclosure.

According to yet another exemplary embodiment, there is a method for generating acoustic waves under water. The method includes a step of actuating first and second rigid pistons with an actuator system provided inside an enclosure, to generate a wave having first frequency; and a step of actuating the first and second pistons with a pressure mechanism attached to the enclosure, to control a pressure of a fluid inside the enclosure such that a pressure of the fluid is substantially equal to an ambient pressure of the enclosure.

According to one more exemplary embodiment, there is a seismic vibro-acoustic source element configured to generate acoustic waves. The seismic vibro-acoustic source element includes an enclosure having a single opening; a single piston configured to close the single opening; an actuator system provided inside the enclosure and configured to actuate the single piston to generate a wave having a first frequency; and a pressure mechanism attached to the enclosure and configured to control a pressure of a fluid inside the enclosure such that a pressure of the fluid is substantially equal to an ambient pressure of the enclosure.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of an acoustic source having an electro-magnetic and pneumatic driven piston. However, the embodiments to be discussed next are not limited to this structure, but may be applied to other structures configured to generate a wave having a controlled frequency range.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a source array having one or more seismic vibro-acoustic source elements. A seismic vibro-acoustic source element is a unit capable of producing an acoustic wave. A source array may include one or more seismic vibro-acoustic source elements. For simplicity, only a seismic vibro-acoustic source element is discussed next. The term "seismic vibro-acoustic source element" is used in the following interchangeably with the term "vibro-acoustic source element." A seismic vibro-acoustic source element may have an electro-magnetic linear actuator system that is configured to drive a piston (or a pair of pistons). However, it is possible to have a hydraulic or piezo-electric actuator instead of the electro-magnetic actuator. The seismic vibro-acoustic source element may also include a pressure mechanism that uses pressure regulation for balancing an external hydrostatic pressure so that a work load on the electro-magnetic actuator system is reduced. The pressure mechanism may also be used to provide an additional force on the piston and thus acoustic output at lower frequencies.

The seismic vibro-acoustic source element may have a radiating piston for radiating the waves and the piston may have an axial guiding shaft directly actuated by the actuator system. The piston may be rigid, i.e., it is not flexible as in U.S. Pat. No. 7,551,518. In other words, a piston is rigid when a part of the piston does not move relative to another part of the piston. A local control system may be provided at the seismic vibro-acoustic source element to control the electro-magnetic actuator system and the pressure mechanism so that a real time control of the seismic vibro-acoustic source element is achieved. Such a real time local control system may be configured to continuously or intermittently correct the behavior of the seismic vibro-acoustic source element to match a desired output. In one application, a cooling system may be provided for cooling the electro-magnetic actuator system. The cooling system may take advantage of the surrounding water for achieving the cooling function. All these features are now discussed in more details in the exemplary embodiments.

Figure 1:
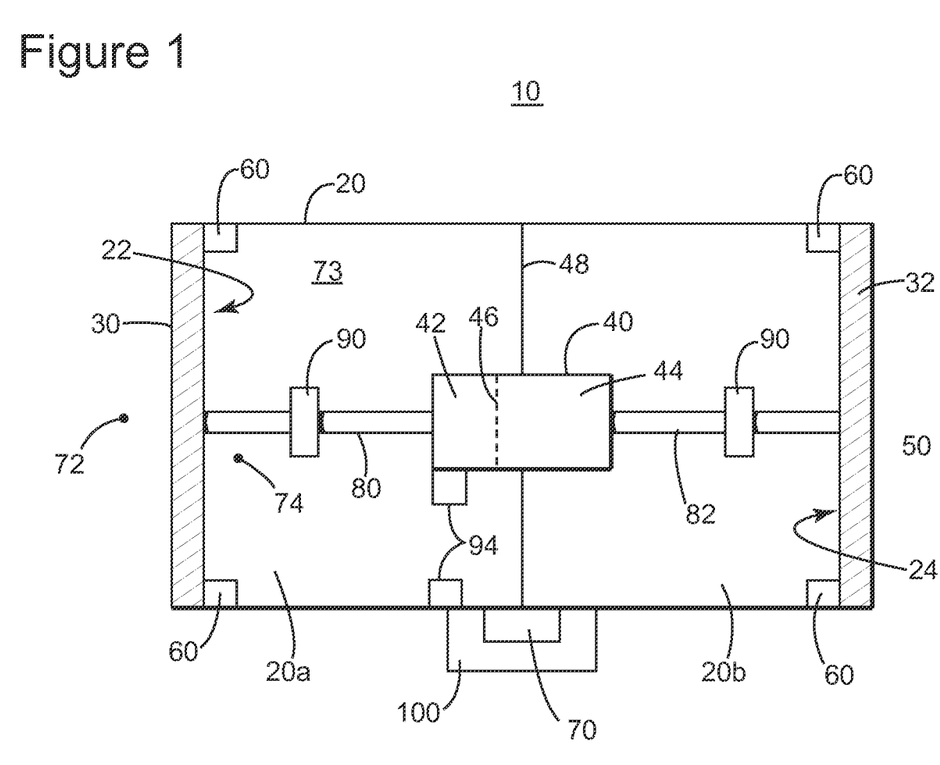
FIG. 1 is a schematic diagram of a seismic vibro-acoustic source element according to an exemplary embodiment.

According to an exemplary embodiment illustrated in FIG. 1, a seismic vibro-acoustic source element 10 of a seismic source includes an enclosure 20 that together with pistons 30 and 32 enclose an electro-magnetic actuator system 40 and separate it from the ambient 50, which might be water. Although FIG. 1 shows two movable pistons 30 and 32, it is noted that a vibro-acoustic source element may have only one movable piston as discussed later. The enclosure 20 has first and second openings 22 and 24 that are configured to be closed by the pistons 30 and 32. The electro-magnetic actuator system 40 is configured to simultaneously drive the pistons 30 and 32 in opposite directions for generating the seismic waves. In one application, the pistons 30 and 32 are rigid. The electro-magnetic actuator system 40 may include two or more individual electro-magnetic actuators 42 and 44. Irrespective of how many individual electro-magnetic actuators are used in a single seismic vibro-acoustic source element 10, the actuators are provided in pairs and the pairs are configured to act simultaneously in opposite directions on corresponding pistons in order to prevent a "rocking" motion of the seismic vibro-acoustic source element 10. In this respect it is noted that it is undesirable to "rock" the seismic vibro-acoustic source element 10 when generating the waves as a position of the seismic vibro-acoustic source element should follow a predetermined path when towed in water.

Figure 2:
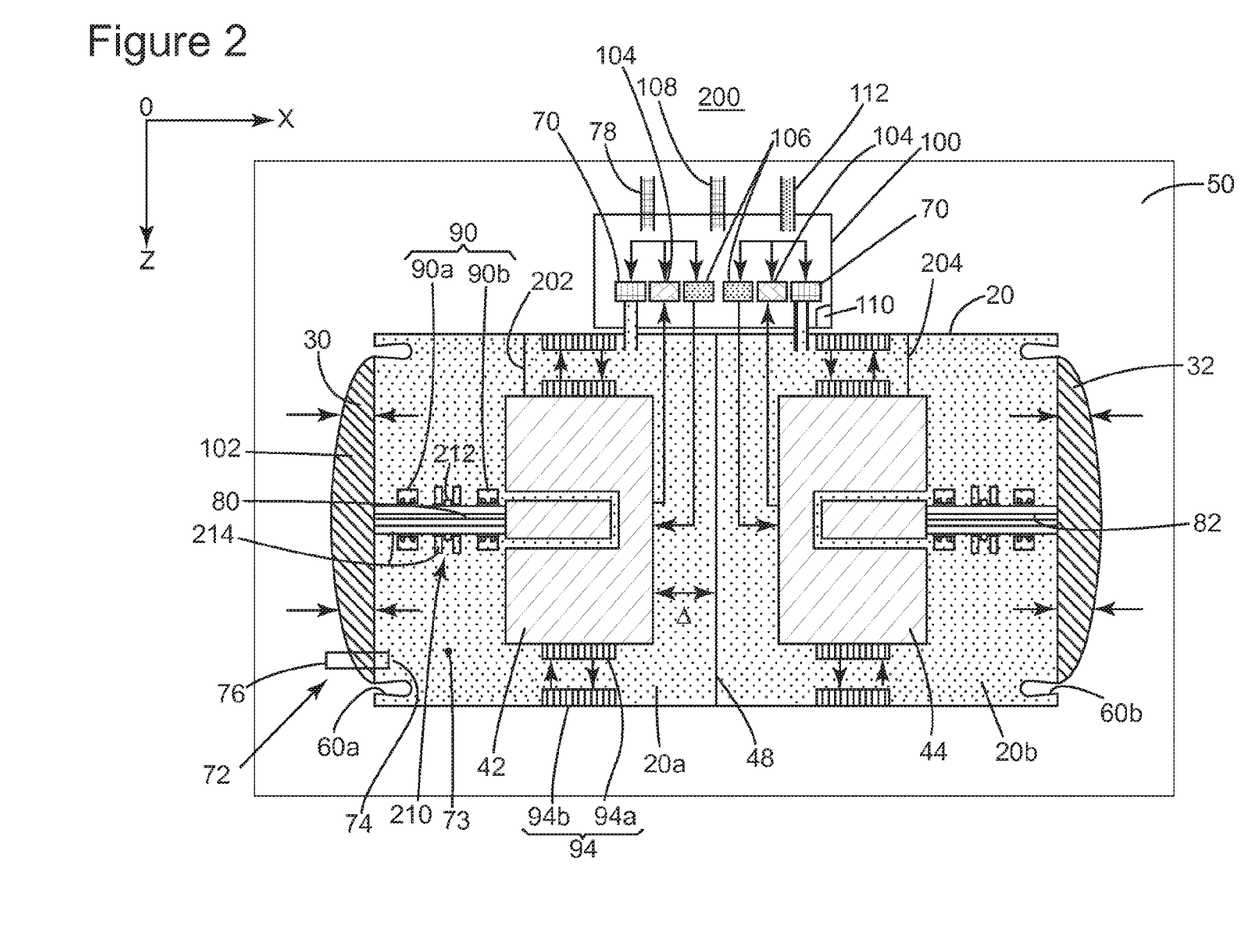
FIG. 2 is a schematic diagram of a seismic vibro-acoustic source element according to another exemplary embodiment.

The size and configuration of the electro-magnetic actuators depend on the acoustic output of the seismic vibro-acoustic source element. FIG. 1 shows that a border 46 between the two actuators 42 and 44 does not have to be at the middle of the actuator system 40. Further, in one embodiment, the two actuators 42 and 44 are formed as a single unit and there is no interface between the two actuators. In still another application, the two actuators 42 and 44 are separated from each other by a predetermined distance, as is shown in FIG. 2. In yet another application, the actuator system 40 is attached to the enclosure 20 by an attachment 48. The attachment 48 may be a strut-type structure. In one application, the attachment 48 may be a wall that splits the enclosure 20 in a first chamber 20a and a second chamber 20b. If the attachment 48 is a wall, the actuators 42 and 44 may be attached to the wall 48 or may be attached to the enclosure 20 by other means in such a way that the actuators 42 and 44 do not contact the wall 48.

In order to provide the pistons 30 and 32 with the ability to move relative to the enclosure 20 in order to generate the seismic waves, a sealing mechanism 60 is provided between the pistons and the enclosure. The sealing mechanism 60 may be configured to slide back and forth with the pistons. The sealing mechanism 60 may be made of elastomeric materials, or may be a metallic flexible structure. In another application, the sealing mechanism 60 may be a gas or liquid seal. A gas seal (air bearing seal) is configured to inject a gas at the interface between the enclosure and the pistons to prevent the ambient water from entering the enclosure. A liquid seal may use, e.g., a ferromagnetic fluid, at the interface between the enclosure and the pistons to prevent the ambient water from entering the enclosure. Other seals may be used as will be recognized by those skilled in the art.

The embodiment shown in FIG. 1 may also include a pressure regulation mechanism 70. The pressure regulation mechanism 70 may be used to balance the external pressure of the ambient 50 with a pressure of the fluid enclosed by the enclosure 20 to reduce a work load of the actuator system 40. It is noted that if a pressure of the ambient at point 72 (in front of the piston 30) is substantially equal to a pressure of the enclosed fluid 73 of the enclosure 20 at point 74, the work load of the actuator system 40 may be used entirely to activate the piston to generate the acoustic wave instead of a portion thereof used to overcome the ambient pressure at point 72. The enclosed fluid 73 of the enclosure 20 may be air or other gases or mixtures of gases.

The pressure mechanism 70 may be a pneumatic mechanism, i.e., uses air for activating the mechanism. The pressure mechanism 70 may be fluidly connected to a pressure source (not shown) on the vessel towing the seismic vibro-acoustic source element 10. The pressure mechanism 70 may also be configured to provide an additional force on the pistons 30 and 32, e.g., at lower frequencies to increase an acoustic output of the seismic vibro-acoustic source element and also to extend a frequency spectrum of the seismic vibro-acoustic source element.

The embodiment illustrated in FIG. 1 may use a single shaft (80 and 82) per piston to transmit the actuation motion from the actuation system 40 to the pistons 30 and 32. However, more than one shaft per piston may be used depending on the requirements of the seismic vibro-acoustic source element. To provide a smooth motion of the shaft 80 relative to the enclosure 20 (e.g., to prevent a wobbling motion of the shaft), a guiding system 90 may be provided.

In one application, heat is generated by the actuation system 40. This heat may affect the motion of the shafts and/or the functioning of the actuator system. For this reason, a cooling system 94 may be provided at the seismic vibro-acoustic source element. The cooling system 94, as will be discussed later, may be configured to transfer heat from the actuator system 40 to the ambient 50.

The pistons 30 and 32 are desired to generate an output having a predetermined frequency spectrum. To control this output, a local control system 100 may be provided, inside, outside or both relative to the enclosure 20. The local control system 100 may be configured to act in real-time to correct the output of the seismic vibro-acoustic source element 10. As such, the local control system 100 may include one or more processors that are connected to sensors that monitor the status of the seismic vibro-acoustic source element 10 and provide commands for the actuator system 40 and/or the pressure mechanism 70.

In order to discuss in more details each of the seismic vibro-acoustic source elements discussed above and to present an operation mode of such a seismic vibro-acoustic source element, a specific seismic vibro-acoustic source element 200 is now presented in FIG. 2. However, this specific seismic vibro-acoustic source element 200 should not be construed as limiting the applicability of the novel features discussed in this document.

As shown in FIG. 2, the seismic vibro-acoustic source element 200 is similar to the seismic vibro-acoustic source element 10 shown in FIG. 1 with a few exceptions. For example, the actuator system 40 has one actuator 42 provided entirely in the first chamber 20a while the other actuator 44 is entirely provided in the second chamber 20b. The actuators 42 and 44 are provided at a predetermined distance D from the wall 48, wherein D is equal to or larger than zero. Support means 202 (e.g., strut, rod, bolt, a mechanical part, etc.) and 204 are provided for each actuator for supporting the actuators relative to the enclosure 20.

The actuators 42 and 44 are the main drivers that actuate the pistons, linearly, back and forth with a predetermined stroke to generate waves having a desired frequency bandwidth (e.g., 4 to 32 Hz). Each linear actuator is made of a moving part and a fixed part, one of them containing permanent passive magnets and the other containing an active coil in which a current is passed through. The force generated by this actuator is directly proportional to the current circulating through the coil component. Either the magnet or the coil can be the moving part, the other one being fixed. Other known electro-magnetic actuators may be used.

Driving shafts 80 and 82 are configured to directly transmit the actuating force from the actuators 42 and 44 to the pistons 30 and 32, respectively. The shafts are configured to prevent off-axial deformation, i.e., are made of a rigid material and/or are provided with guides. In one application, a shaft is rigid (e.g., made of steel), stiff and may have a circular, rectangular or square profile. Of course, other profiles may be used. In a variant, this shaft can also be divided into, e.g., three shafts mounted at 120 degrees from each other in order to spread the force and further increase the off-axial stiffness. Other arrangements are also possible.

The shafts 80 and 82 may be aided by the guiding system 90 to achieve axial motion of the pistons 30 and 32 and to prevent off-axial deformation. For example, FIG. 2 shows two guiding elements 90a and 90b disposed around shaft 80. More or less guiding elements may be used. The guiding elements are configured to achieve this task without deteriorating too fast or wearing or damaging the shaft. For example, the guiding elements may use an air cushion mechanism, a liquid cushion or metallic contact with balls and/or rollers. In one application, the guiding elements may include ball bearings that contact and guide the shaft.

The shaft 80 (also 82) may be provided with end-stop mechanisms 210. An end-stop mechanism 210 is configured to stop the axial movement (along axis X in the figure) of the shaft, i.e., prevents the shaft from excessive displacement. This mechanism may be made of a hard material and may include some damping layers to damp the impact forces. In one application, the end-stop mechanism 210 may include a first piece 212 attached to the shaft 80 and one or two stoppers 214 that limit the motion of the first piece 212. Other arrangements are also possible.

The piston 30 is attached to an end of the shaft 80 (similar for piston 32 and shaft 82). The piston 30 is rigid and made of a material that does not deform over the required bandwidth. The piston 30 may have a circular, spherical or other cross-sectional shapes. The shape and size of the piston 30 are designed in such a way as to enhance an acoustic output while minimizing the work load induced by the water mass of the ambient.

As discussed with regard to the embodiment of FIG. 1, the fluid 73 trapped inside the enclosure 20 may be air. This fluid 73 is pressurized by the pressure mechanism 70 to balance the external hydrostatic pressure of the ambient (water). The fluid 73 also acts as a spring as will be discussed later. Depending on the application, additional mechanical springs may be necessary and will be added directly on the shaft or piston.

In order to prevent the water to enter inside the enclosure 20, seals 60a and 60b are provided between each piston and the enclosure 20. The seals 60a and 60b shown in FIG. 2 may be made of an elastomeric material and they are flexible, allowing the pistons to move back and forth along the X axis without allowing the water to enter inside the enclosure 20.

The pneumatic regulation system 70, as discussed above, may have a dual function. The pneumatic regulation system 70 controls a pressure of the fluid 73 inside the enclosure 20 to be substantially equal to a pressure of the ambient. For this reason, a pressure differential sensor 76 may be provided to determine a pressure difference between, for example, points 72 and 74. In this way, the pneumatic regulation system 70 may allow air under pressure to enter or exit enclosure 20 to balance the pressures. The air under pressure may be supplied by an external supply, e.g., a pipe or hose coming from the seismic vessel. An excess of air pressure may be released outside the enclosure 20, for example, directly to the ambient or returned to the vessel. The pressure mechanism 70 may be configured to regulate the pressure inside the enclosure 20 as the external pressure varies due to waves or changes in depth.

A second optional function of the pressure mechanism 70 is to drive the pistons (30 and 32) with an additional force at lower frequencies, e.g., less than 4 Hz. Thus, the piston 30 would generate a wave having a first frequency due to the movement of the actuator system 40 and a wave having a second frequency due to the increased or decreased pressure generated by the pressure mechanism 70. In other words, the piston would generate at least two different frequencies at the same time, one frequency controlled by the actuator system 40 and the other frequency controlled by the pressure mechanism 70. This advantage of the novel vibro-acoustic source element is discussed later.

The control system 100 is provided locally at the seismic vibro-acoustic source element 200. The control system 100 is responsible for one or more functions. For example, the control system 100 is linked to sensors (e.g., piston position and acceleration) 102 for measuring the signal generated by the pistons. Then, the control system 100 compares the measured signal and its behavior with the desired signal and its behavior. If a mismatch between these elements is larger than a predetermined threshold, the control system 100 may locally instruct the actuator system 40 to change a current that drives the actuators 42 and 44. Similarly, the control system 100 may be configured to receive information from the pressure difference sensor 76 and to determine what pressure to establish inside the enclosure 20 for balancing the ambient pressure. Furthermore, the control system 100 may be configured to control the pressure mechanism 70 in order to drive the pistons 30 and 32 at the desired frequency.

FIG. 2 shows the control system 100 including a processor 104 that is connected to the pressure mechanism 70, the actuators 42 and 44 and also to power amplifiers 106. The power amplifiers 106 are configured to convert an electrical power received from an electrical port 108 to a required current to be applied on the actuators 42 and 44. The control system 100 also includes any electronics components 110 that support the power transformation, real-time control, sensing and telemetry functions described above. The control system 100 may be provided in a housing, which may be hermetically sealed from the ambient for preventing the water to reach the control system. The control system 100 may be kept in this housing at substantially atmospheric pressure. A data and command port 112 may be provided for facilitating data exchange between the control system 100 and the vessel.

According to an exemplary embodiment, the cooling system 94 may include a first heat exchanger 94a and a second heat exchanger 94b. The first heat exchanger 94a may be provided on the actuator 42 to remove the heat from the actuator. The second heat exchanger 94b may be provided on the enclosure 20, for transferring heat from the actuator to the outside of the source. The fluid 73 may be used as the working fluid to transfer heat from the first heat exchanger 94a to the second heat exchanger 94b. A dedicated piping system with its own working fluid may be provided between the first and second heat exchangers to transfer the heat.

Having described a possible embodiment of the seismic vibro-acoustic source element having a plurality of novel features, an operation of the seismic vibro-acoustic source element is now discussed. The control system 100 may include, as will be described later, a processor and a storage device. Instructions (e.g., software) may be downloaded to the control system 100 either prior to deploying the seismic vibro-acoustic source element underwater or while the seismic vibro-acoustic source element is towed to control various activities as discussed next. One such activity is maintaining the pressure equilibrium between the ambient and the inside of the seismic vibro-acoustic source element. The control system instructs the pressure mechanism to perform this function. If the pressure inside the enclosure 20 is smaller than the pressure of the ambient, the pressure mechanism allows more pressure from the pressure port 78 to enter the enclosure 20. If the pressure inside the enclosure 20 is higher than the pressure of the ambient, part of the fluid inside the enclosure is allowed to exit the enclosure so as to reduce its internal pressure.

The control system 100 is also configured to control the actuator system 40. As noted above, the control system 100 may have the instructions for controlling the actuator system stored locally in the storage device and the processor may instruct an appropriate element to achieve this function. For example, the processor may instruct the actuator system 40 to play a driving signal, (e.g., a sweep or other kind of signal) of force by pushing and pulling the axially guided shaft back and forth. In this way, the piston attached to the shaft is driven to impose an acoustic pressure in the surrounding ambient so as to generate the desired acoustic wave.

A displacement of the piston depends on the force available from the electro-magnetic actuator system 40, the frequency desired to be emitted, the mass of the water to be pushed by the piston (which depends on the area of the piston among other things) and the spring stiffness of the fluid inside the enclosure. For the lowest frequencies, the piston displacement may be substantial and mechanically limited by the end-stop mechanism. As the frequency increases, the displacement may rapidly decrease and quickly become almost negligible although the force delivered by the actuator may be close to maximum.

Figure 3:
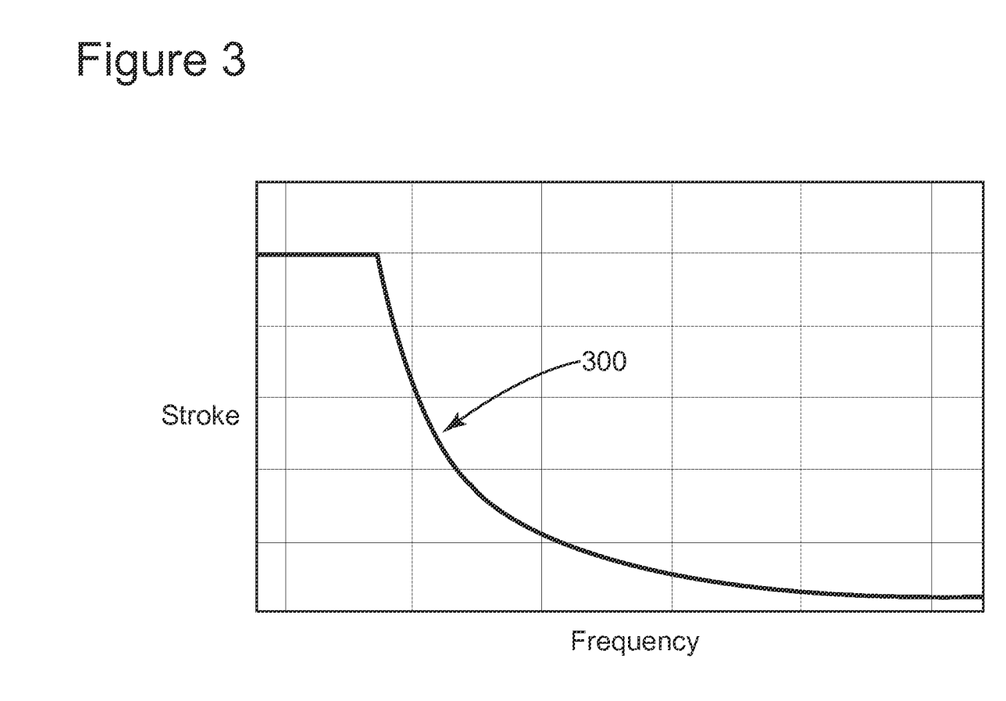
FIG. 3 is a graph illustrating a stroke of a piston when actuated by an electro-magnetic actuator of a seismic vibro-acoustic source element according to an exemplary embodiment.

In this regard, FIG. 3 illustrates a variation of the stroke of the electro-magnetic actuator as a function of the frequency of the emitted seismic wave by the piston. It is noted that approximately 15% of the bandwidth requires the maximum stroke while the rest of the bandwidth does not take full advantage of the available stroke. It is also noted that the stroke rapidly decreases as the frequency of the emitted seismic wave increase as indicated by curve 300.

In this basic operation mode, the pressure mechanism is not used to generate a low-frequency seismic wave. The pressure mechanism is configured for this basic operation mode to only balance the pressure inside and outside the enclosure. For the basic operation mode, a frequency emitted by the seismic vibro-acoustic source element shown in FIG. 2 is between 4 and 32 Hz. A similar design may be used for the generation of seismic wave with higher frequencies (e.g., 32 to 300 Hz). The seismic vibro-acoustic source element shown in FIG. 2 is configured to move the pistons 30 and 32 at the same time (simultaneously) in opposite directions. In this way, there is no net force acting on the seismic vibro-acoustic source element to make the seismic vibro-acoustic source element to "rock," which is undesirable.

The discussed seismic vibro-acoustic source element does not use a hydraulic fluid or oil and thus it constitutes a less pollutant source. Even if the seismic vibro-acoustic source element fails or breaks down, there are no hydraulic materials to be released in the environment. In addition, the seismic vibro-acoustic source element is a highly linear system. Thus, a quality of the output signal is better than existing sources and no signal cleaning procedures are necessary. The seismic vibro-acoustic source element has a small volume, for example, 1000 l per piston. The seismic vibro-acoustic source element also does not rely on deforming parts as the conventional sources, which intrinsically are prone to failure. Thus, lifetime and reliability of the seismic vibro-acoustic source element are improved.

Figure 4:
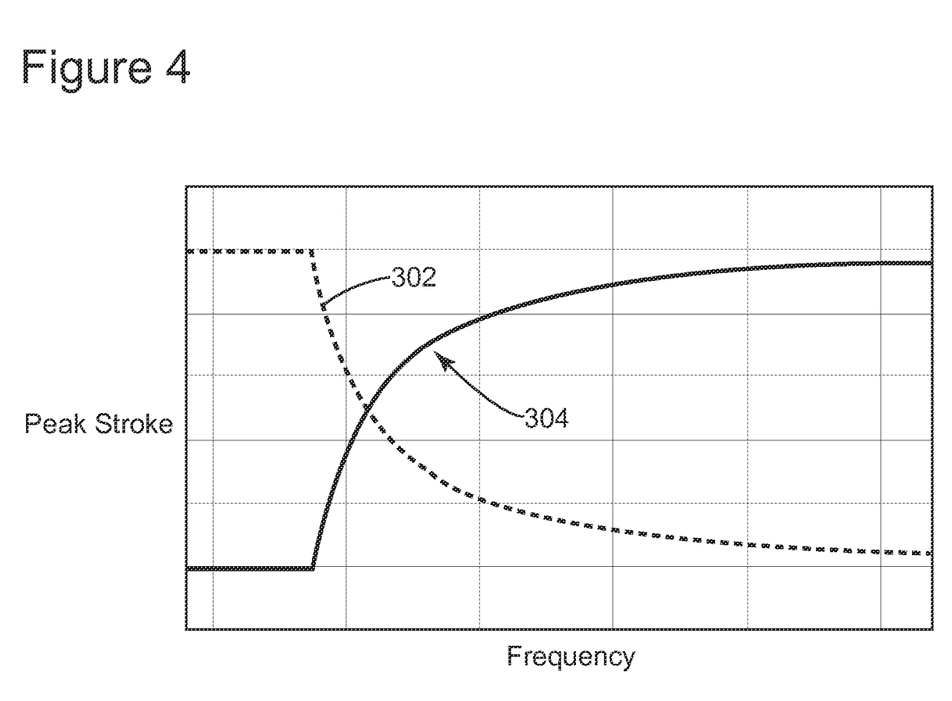
FIG. 4 is a graph illustrating a stroke of a piston when actuated by an electro-magnetic actuator and a pressure mechanism of a seismic vibro-acoustic source element according to an exemplary embodiment.

The seismic vibro-acoustic source element may also operate in an advanced operation mode. The advanced operation mode adds to the basic operation mode the capability of running a low-frequency driving signal that overlaps with a high-frequency driving signal, as shown in FIG. 4. More specifically, when the frequency delivered by the electro-magnetic actuator increases and the displacement of the piston decreases, as shown by curve 302 in FIG. 4, the pneumatic actuator simultaneously runs a low-frequency driving signal that overlaps with the high-frequency driving signal as shown by curve 304 in FIG. 4. In this way, as the stroke of the shaft decreases for the high-frequency driving signal, the pressure mechanism takes advantage of the remaining stroke to run the low-frequency driving signal. This act enhances the low-frequency acoustic output at no cost for the electro-magnetic actuator and for the seismic vibro-acoustic source element. It is noted that the low-frequency driving signal of the pressure mechanism may increase the low-frequency range of the seismic vibro-acoustic source element, for example, generating seismic waves in the 0 to 4 Hz range.

In one application, the control system is configured to drive the electro-mechanical actuator system and the pressure mechanism so that the piston 30 simultaneously produces two waves having different frequencies.

Because of the large area of the piston (which acts as an efficient pressure to force transformer) and the relatively low stiffness of the seismic vibro-acoustic source element, the pneumatic pressure changes required from the pneumatic regulator are fairly small and can be reached without the need of high air flows.

A variant of the seismic vibro-acoustic source element discussed above is shown in FIG. 5. According to this exemplary embodiment, a seismic vibro-acoustic source element 500 of a source array has an increased stroke comparative to the seismic vibro-acoustic source element 200 shown in FIG. 2. The stroke limitation of the seismic vibro-acoustic source element 200 is mainly due to the mechanical limit of the electro-magnetic actuator system 40. However, the total stroke limitation of the system may be increased if the enclosure 20 is separated into a front enclosure 502 and a back enclosure 504 in such a way that the actuator 42, the guiding system 90 and the end-stop mechanism 210 are mounted in the front enclosure 502. An internal wall 540 separates the front enclosure 502 from the back enclosure 504. It is noted that the front enclosure 502 together with the back enclosure 504 correspond to the first chamber 20a of FIG. 2. The second chamber 20b is not shown in FIG. 5 but is understood to have the same structure as the first chamber 20a and it is provided symmetrically relative to the line 506 so that the first chamber 20a and the second chamber 20b form the seismic vibro-acoustic source element 500. Thus, the following discussion focuses only on chamber 20a with the understanding that the structure of chamber 20b is identical.

Figure 5:
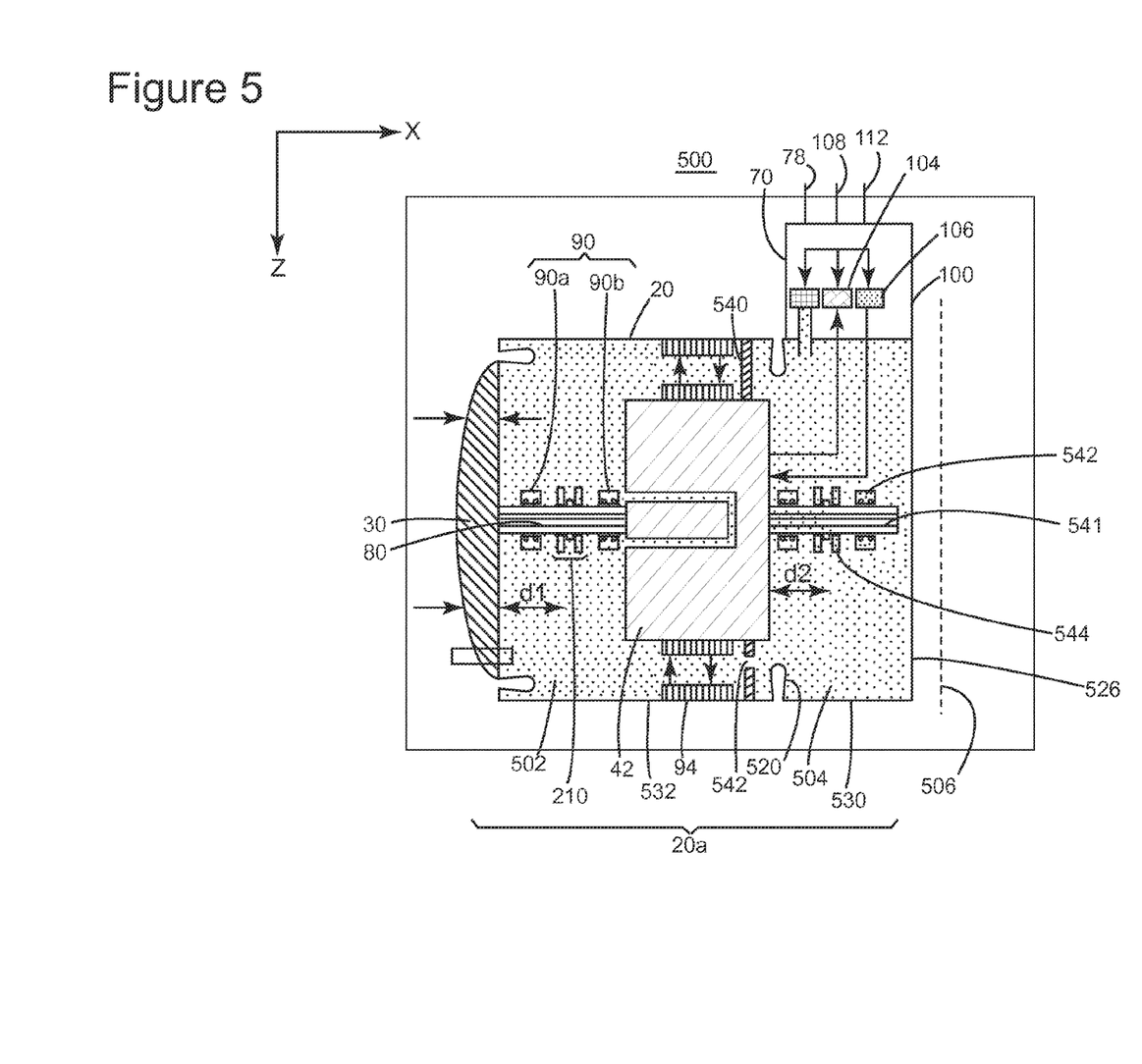
FIG. 5 is a schematic diagram of another seismic vibro-acoustic source element according to an exemplary embodiment.

An additional seal 520 is placed between the front enclosure 502 and the back enclosure 504 so that the front enclosure 502 can move relative to the back enclosure 504. It is noted that a back wall 526 of the first chamber 20a is fixed relative to the seismic vibro-acoustic source element 500. In other words, the enclosure 20 is split between a fixed part 530 (that corresponds to the back enclosure 504 and is fixed) and a movable part 532 (that corresponds to the front enclosure 502) that is configured to move together with its content (e.g., actuator 42) relative to the fixed part 530. The internal wall 540 separates the front enclosure 502 from the back enclosure 504 and has a passage 542 that allows fluid communication between the back enclosure and the front enclosure. Thus, slow pressure variations between the front and back enclosures will pass from one enclosure to the other one while the fast variations will not.

The actuator 42 (its fixed part relative to the front enclosure 502) is mounted in the front enclosure and attached to it so that the fixed part of the actuator 42 moves together with the front enclosure 502. In order to control the movement of the entire actuator 42, a shaft 541 is attached to the fixed part of the actuator 42. The shaft is provided through a guiding mechanism 542 and may be provided with a stop end mechanism 544 similar to that shown in FIG. 2. In this way, when the pressure of the fluid in the back enclosure 504 is increased, the entire actuator 42 moves forward, along the negative direction of axis X, thus eliminating or minimizing wobble of the actuator 42.

Thus, in this embodiment, the electro-magnetic actuator system 40 and the pressure mechanism 70 act in series and not in parallel as in FIG. 2. In other words, if the actuator system 40 displaces the piston 30 with a distance d1, the pressure mechanism 70 further displaces the piston 30 by a distance d2, so that the piston is displaced by a total distance of d1+d2. It is also noted that according to this embodiment, the actuator system 40 is displaced by the distance d2 when the pressure mechanism 70 is activated. This arrangement allows the whole front enclosure 502, the actuator system 40 and the piston 30 to move when the pressure mechanism 70 pressurizes or depressurizes the back enclosure 504, using the full stroke for the actuator system 40. The actuator system 40 can also drive the piston 30 with its own stroke.

The operation of the seismic vibro-acoustic source element 500 is similar to the operation of seismic vibro-acoustic source element 200 except that the low-frequency driving signal does not have to be applied when the stroke corresponding to the high-frequency driving signal is decreased.

Figure 6:
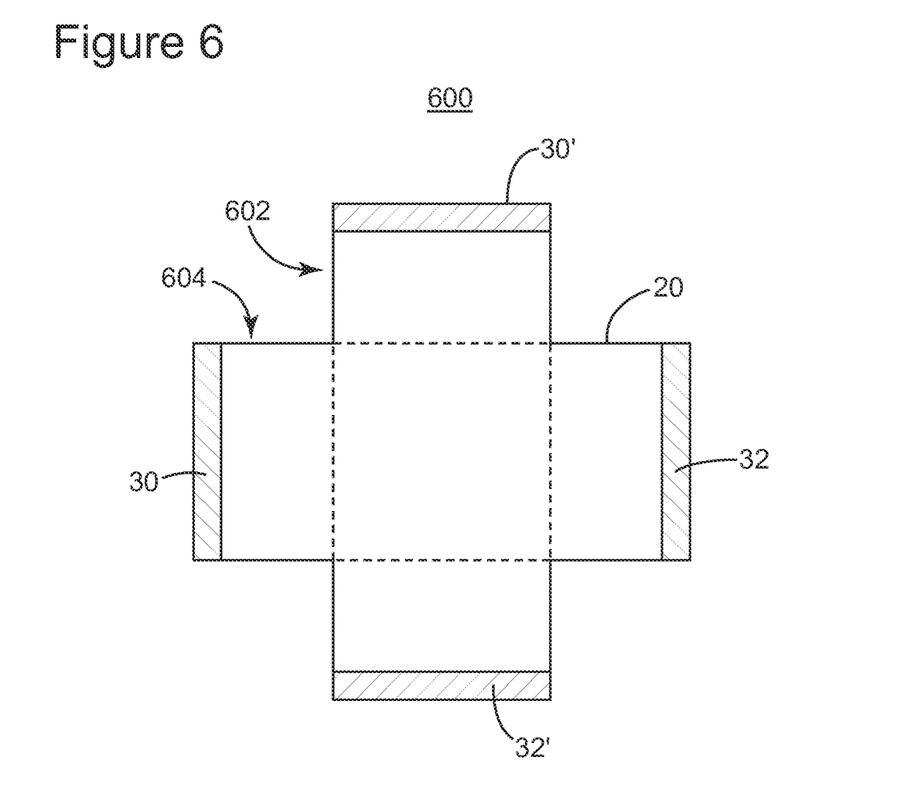
FIG. 6 is a schematic diagram of a source having plural vibro-acoustic source elements according to an exemplary embodiment.

A source array 600 having a pair 602 and 604 of seismic vibro-acoustic source elements that include four moving pistons instead of two is shown in FIG. 6. According to this exemplary embodiment, pistons 30 and 32 are actuated simultaneously while pistons 30' and 32' are also actuated simultaneously. The two pairs may be actuated simultaneously or not. Corresponding actuator systems are provided for each pair as discussed either in the embodiment related to FIG. 2 or the embodiment related to FIG. 5. More than two pairs may be used.

Figure 7:
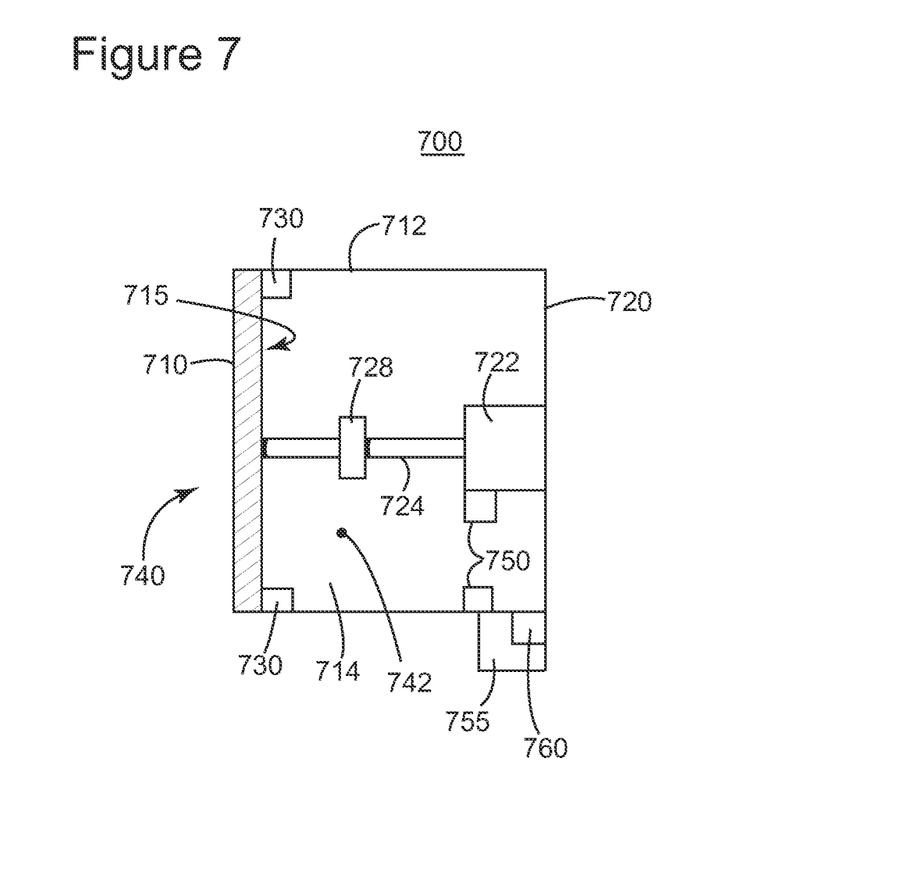
FIG. 7 is a schematic diagram of another seismic vibro-acoustic source element according to an exemplary embodiment.

An alternative vibro-acoustic source element is shown in FIG. 7. The vibro-acoustic source element 700 includes a single movable piston 710 and together with an enclosure 712 form a chamber 714. The chamber 714 has an opening 715 that is configured to receive the movable piston 710. A wall 720 closes the enclosure 712 and an electro-mechanical actuator 722 is provided inside the chamber 714, e.g., attached to the wall 720. A rod 724 connects to the piston 710 and is activated by the actuator 722. A guiding system 728 may be provided to guide the rod 724. Seals 730 are provided between the piston 710 and the enclosure 712 for preventing a medium from an ambient 740 to mix with a medium 742 of the chamber 714. A cooling system 750 similar to the cooling system 94 shown in FIG. 1 may be provided. Further, a control system 755 and a pneumatic mechanism 760 may be provided at the vibro-acoustic source element 700 for controlling a movement of the piston 710. Thus, the embodiment shown in this figure is similar to that shown in FIGS. 1 and 2 except that only one movable piston is provided for the entire vibro-acoustic source element.

Figure 8:
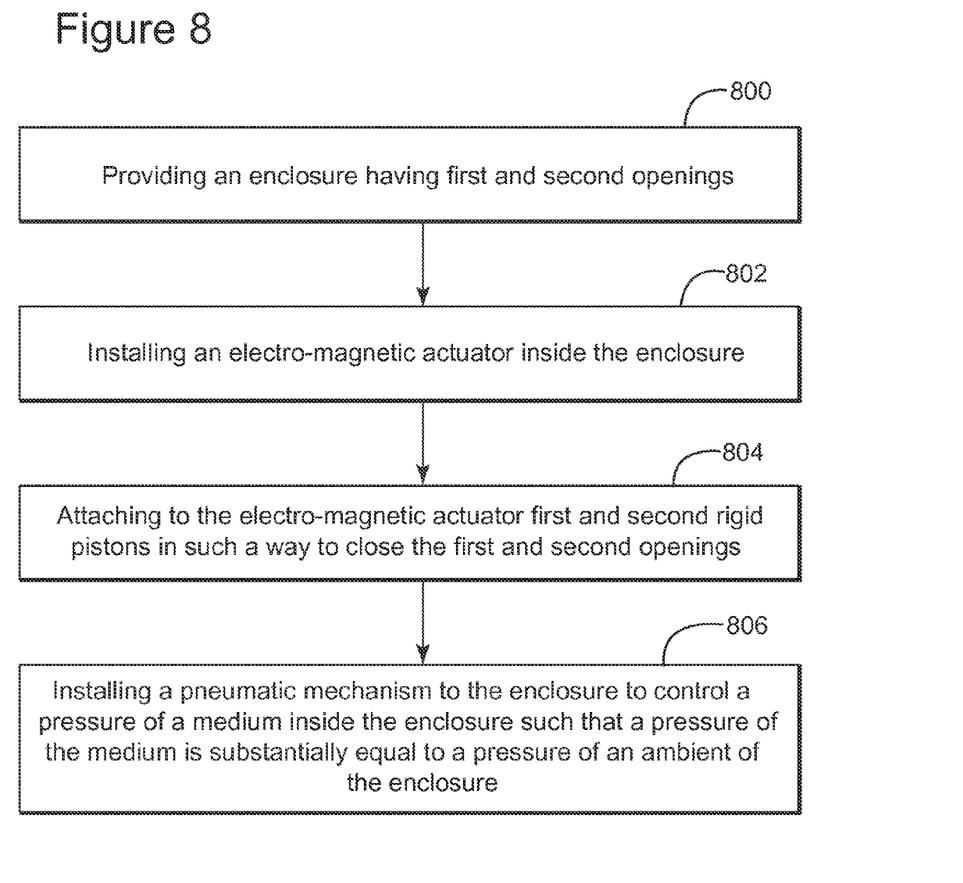
FIG. 8 is a flow chart of a method for assembling a seismic vibro-acoustic source element according to an exemplary embodiment.

According to an exemplary embodiment illustrated in FIG. 8, there is a method for assembling a seismic vibro-acoustic source element (10) configured to generate acoustic waves under water. The method includes a step 800 of providing an enclosure (20) having first and second openings (22, 24); a step 802 of installing an electro-magnetic actuator (40) inside the enclosure (20); a step 804 of attaching to the electro-magnetic actuator (40) first and second rigid pistons (30, 32) in such a way to close the first and second openings (22, 24); and a step 806 of installing a pressure mechanism (70) to the enclosure (20) to control a pressure of a fluid inside the enclosure (20) such that a pressure of the fluid is substantially equal to an ambient pressure of the enclosure.

Figure 9:
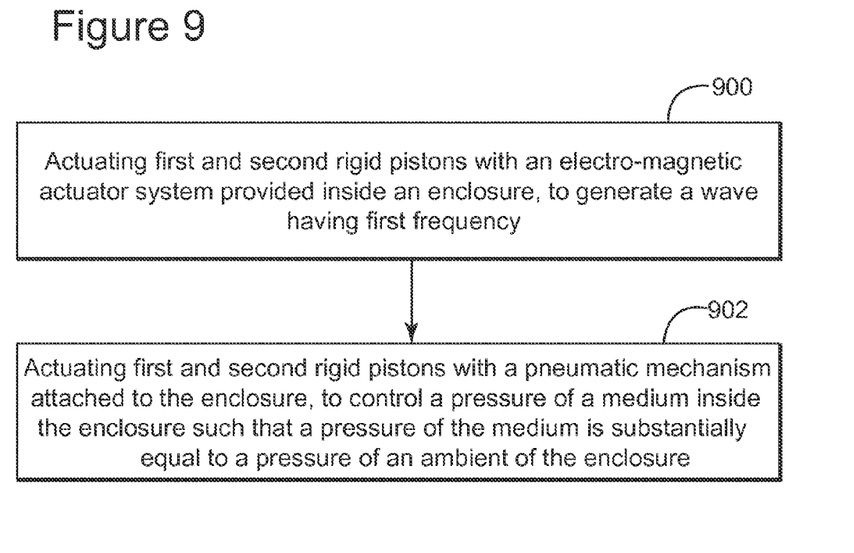
FIG. 9 is a flow chart of a method for using the seismic vibro-acoustic source element according to an exemplary embodiment.

According to another exemplary embodiment illustrated in FIG. 9, there is a method for generating acoustic waves under water. The method includes a step 900 of actuating first and second rigid pistons (30, 32) with an electro-magnetic actuator system (40) provided inside an enclosure (20), to generate a wave having first frequency; and a step 902 of actuating the first and second pistons (30, 32) with a pressure mechanism (70) attached to the enclosure (20) to control a pressure of a fluid inside the enclosure (20) such that a pressure of the fluid is substantially equal to an ambient pressure of the enclosure.

Figure 10:
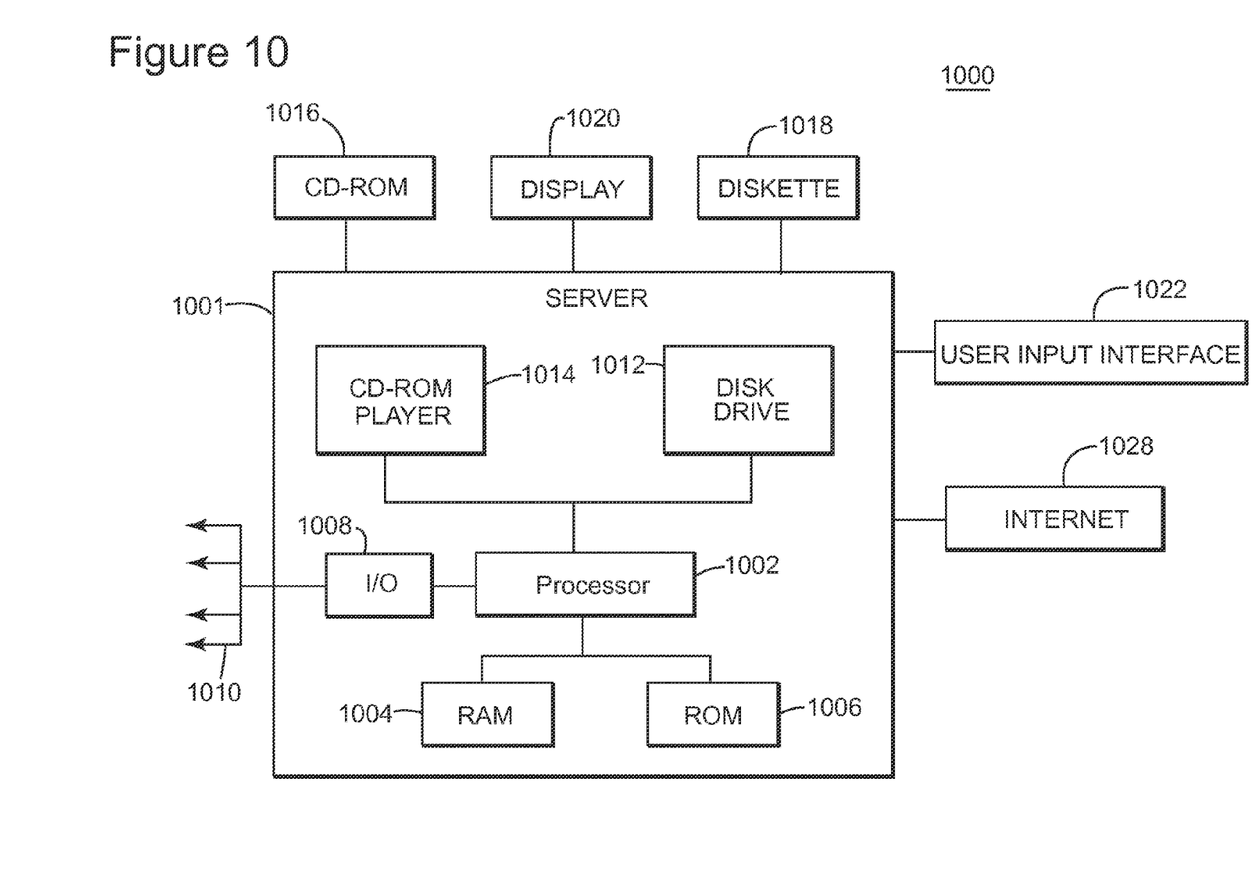
FIG. 10 is a schematic diagram of a control system.

An example of a representative control system capable of carrying out operations in accordance with the exemplary embodiments discussed above is illustrated in FIG. 10. Hardware, firmware, software or a combination thereof may be used to perform the various steps and operations described herein. The control system 1000 of FIG. 10 is an exemplary computing structure that may be used in connection with such a system.

The exemplary control system 1000 suitable for performing the activities described in the exemplary embodiments may include server 1001. Such a server 1001 may include a central processor unit (CPU) 1002 coupled to a random access memory (RAM) 1004 and to a read-only memory (ROM) 1006. The ROM 1006 may also be other types of storage media to store programs, such as programmable ROM (PROM), erasable PROM (EPROM), etc. The processor 1002 may communicate with other internal and external components through input/output (I/O) circuitry 1008 and bussing 1010, to provide control signals and the like. For example, the processor 1002 may communicate with the sensors, electro-magnetic actuator system and/or the pressure mechanism. The processor 1002 carries out a variety of functions as is known in the art, as dictated by software and/or firmware instructions.

The server 1001 may also include one or more data storage devices, including hard and floppy disk drives 1012, CD-ROM drives 1014, and other hardware capable of reading and/or storing information such as a DVD, etc. In one embodiment, software for carrying out the above discussed steps may be stored and distributed on a CD-ROM 1016, diskette 1018 or other form of media capable of portably storing information. These storage media may be inserted into, and read by, devices such as the CD-ROM drive 1014, the disk drive 1012, etc. The server 1001 may be coupled to a display 1020, which may be any type of known display or presentation screen, such as LCD displays, plasma displays, cathode ray tubes (CRT), etc. A user input interface 1022 is provided, including one or more user interface mechanisms such as a mouse, keyboard, microphone, touch pad, touch screen, voice-recognition system, etc.

The server 1001 may be coupled to other computing devices, such as the equipment of a vessel, via a network. The server may be part of a larger network configuration as in a global area network (GAN) such as the Internet 1028, which allows ultimate connection to the various landline and/or mobile client/watcher devices.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile discs (DVD), optical storage devices, or magnetic storage devices such a floppy disk or magnetic tape. Other non-limiting examples of computer readable media include flash-type memories or other known types of memories.

The disclosed exemplary embodiments provide a source, seismic vibro-acoustic source element and a method for generating under sea seismic waves with improved frequency spectrum. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for generating acoustic waves under water, the method comprising:
    actuating first and second pistons with an actuator system provided inside an enclosure of a source element, to generate a wave having a first frequency, wherein the actuator system translates first and second shafts connected to the first and second pistons, respectively, to generate the wave; and
    actuating the first and second pistons with a pressure mechanism attached to the enclosure, to control a pressure of a fluid inside the enclosure such that a pressure of the fluid is substantially equal to an ambient pressure of the enclosure,
    wherein the enclosure has first and second openings and the first and second pistons are configured to close the first and second openings.

2. The method of claim 1, further comprising:
    actuating the first and second pistons with the pressure mechanism to generate a wave having a second frequency different from the first frequency, wherein the first and second frequencies are generated at the same instant.

3. The method of claim 1, wherein a wall is configured to separate the enclosure into a first chamber and a second chamber.

4. The method of claim 3, wherein the actuator system is an electro-magnetic actuator system that comprises:
    a first actuator provided in the first chamber; and
    a second actuator provided in the second chamber,
    wherein the first and second actuators are configured to act simultaneously on the first and second pistons.

5. The method of claim 1, further comprising:
    cooling the actuator system with a cooling system.

6. The method of claim 1, further comprising:
    controlling the actuator system and the pressure mechanism with a control system provided on or inside the enclosure.

7. The method of claim 6, wherein the control system is configured to make locally control decisions for the actuator system and the pressure mechanism.

8. The method of claim 6, further comprising:
    supplying a fluid under pressure at a pressure port to the pressure mechanism;
    transmitting data through a data port, between the control system and a vessel to which the source element is connected to; and
    receiving electrical power at an electrical power port for the actuator system.

9. The method of claim 6, wherein the control system is configured to drive the pressure mechanism so that the first and second pistons generate an acoustic wave having a frequency between 0 and 4 Hz.

10. The method of claim 6, wherein the control system is configured to drive the electro-mechanical actuator system and the pressure mechanism so that the piston simultaneously produces two waves having different frequencies.

* * * * *